United States Patent

[11] 3,624,534

[72] Inventor Geoffrey Thomas Clayworth
Chelmsford, England
[21] Appl. No. 11,953
[22] Filed Feb. 17, 1970
[45] Patented Nov. 30, 1971
[73] Assignee English Electric Valve Company Limited
London, England
[32] Priority Feb. 20, 1969
[33] Great Britain
[31] 9,189/69

[54] UHF KLYSTRON AMPLIFIER HAVING A SUBSTANTIALLY LINEAR INPUT/OUTPUT CHARACTERISTIC
2 Claims, 3 Drawing Figs.

[52] U.S. Cl. .... 330/47, 307/237, 330/149, 331/83, 332/7
[51] Int. Cl. .... H03f 3/56
[50] Field of Search .... 332/7, 13, 25, 58; 330/43, 47, 44, 149, 151; 307/237; 333/81, 81 A, 81 C; 331/6, 7, 83, 84

[56] References Cited

UNITED STATES PATENTS

| | | | |
|---|---|---|---|
| 3,461,401 | 8/1969 | Williams | 331/83 X |
| 3,518,585 | 6/1970 | Wilcox | 333/81 |
| 2,787,673 | 4/1957 | Cutler | 330/43 |
| 3,390,349 | 6/1968 | Hallford | 331/84 X |
| 3,541,467 | 11/1970 | Seidel | 330/151 X |

*Primary Examiner*—Alfred L. Brody
*Attorney*—Baldwin, Wight & Brown

ABSTRACT: Known Klystrons are not linear amplifying devices, and so it is not possible to use a Klystron for the common amplification of UHF carriers modulated with a number of different modulating signals.

In the invention a multimodulated UHF Klystron amplifier comprises an amplifying Klystron and a correcting circuit having a nonlinear operating gain/signal level characteristic so chosen in relation to the nonlinear output/input characteristic of the Klystron that the overall output/input characteristic of the combination of Klystron and correcting circuit is substantially linear over a desired wide range of input.

INVENTOR
Geoffrey Thomas Clayworth
BY
Baldwin Wight Diller & Brown
ATTORNEYS

UHF KLYSTRON AMPLIFIER HAVING A SUBSTANTIALLY LINEAR INPUT/OUTPUT CHARACTERISTIC

This invention relates to Klystron amplifier circuit arrangements and more specifically to Klystron amplifier circuit arrangements for amplifying modulated UHF (ultrahigh-frequency) signals.

It is commonly required in television transmitters to effect amplification of UHF carrier signals which are modulated with video signals and also with accompanying sound signals. In the case of a color television transmitter the UHF vision carrier is also modulated with the color subcarrier carrying color information.

In these (and other) cases it is desirable to be able to use a Klystron common amplification of UHF carriers modulated with a number of and sound modulating signal—e.g. vision and sound signals, and, the case of color television transmission, a color derated by modulated color subcarrier also—but it is not possible, with known Klystron amplifiers as at present in general use to employ a Klystron efficiently for such purposes. The reason for this lies in the fact that a Klystron is not a liner amplifying device nor does it approximate reasonably closely to a linear amplifying device except over a very limited range of input power.

Figure 1:
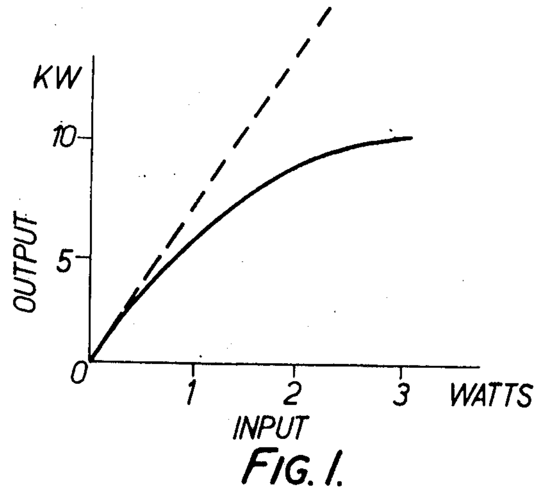

FIG. 1 of the accompanying drawings shows in full line an input power (abscissae)/output power (ordinates) characteristic curve of a typical Klystron capable of providing to about an output power of up tobout 10 kw. handling input powers of up to about 3 watts. It will be observed that this characteristic has marked curvature and, for comparison purposes, there is also shown, in broken line, a linear characteristic. As will be seen the curved characteristic approximates reasonably closely to the linear only for the small input powers of not more than about a quarter of the maximum input power which can be handled. At input powers above this relatively small value the curvature increases rapidly and from about half maximum input power upwards the curvature becomes great. If, therefore, a Klystron with a characteristic as typified by FIG. 1 is used to amplify UHF carriers modulated with several different modulating signals, and is driven anywhere near fully, i.e., (for the case of FIG. 1) is driven by signals of much more than about ¾ watt, the curvature of the characteristic results in increasing intermodulation between the various different modulating signal. This is a most serious defect, especially in the case of a color television transmitter in which such intermodulation can result in intolerable interference with the vision signals by color patterning. Because of this intermodulation problem a Klystron, when used in a television transmitter as a UHF amplifier amplifying simultaneously UHF carriers modulated with color vision and sound signals, has to be heavily "under run"—typically it may have to be derated by a factor of between 5 and 10 to 1 so that its maximum permissible output power is held down to between one-fifth and one-tenth of the full rated output with consequent inefficiency and cost. The present invention seeks to overcome this defect and limitation.

According to this invention a UHF Klystron amplifier for simultaneously amplifying a plurality of UHF carriers modulated with different modulating signals—such an amplifier will hereinafter be termed, for the sake of brevity, a multimodulated UHF Klystron amplifier—comprises an amplifying Klystron and a correcting circuit having a nonlinear operating gain/signal level characteristic so chosen in relation to the nonlinear output/input characteristic of said Klystron that the overall output/input characteristic of the combination of Klystron and correcting circuit is substantially linear over a desired wide range of input.

Preferably the correcting circuit consists of a so-called P.I.N. (Positive, Intrinsic, Negative) diode circuit including one or more diodes and means for applying thereto an attenuation-controlling signal derived from the input to be amplified.

In a preferred embodiment a multimodulated UHF Klystron amplifier comprises a signal path including an amplifying Klystron, a P.I.N. diode attenuator and a delay circuit; a directional coupler in said path and connected and arranged to branch off a proportion of the input to be amplified to a rectifier; and means for utilizing rectified output from said rectifier as an attenuation-controlling signal for said P.I.N. diode attenuator; the delay of said delay circuit being the same as that in the path extending from the directional coupler through the rectifier to the P.I.N. diode attenuator and the whole arrangement being such that the overall output/input characteristic of the amplifier is substantially linear over the working input range. Preferably the rectified output is amplified by a video amplifier of variable gain before application as an attenuation-controlling signal to the attenuator.

Figure 2:
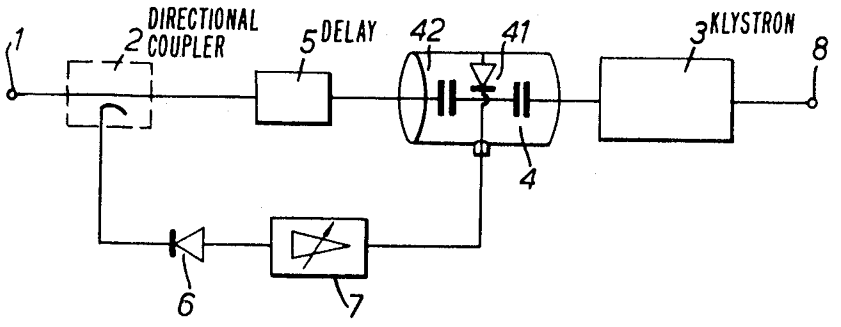

FIG. 2 of the accompanying drawings is a diagram of a preferred embodiment of the invention. In this embodiment it is assumed that the output/input characteristic of the Klystron amplifier is shaped as illustrated by FIG. 1. The accompanying FIG. 3 shows the shape of the level/attenuation characteristic which (on the foregoing assumption) is manifested by the attenuator under the control of the rectified output from the rectifier.

Referring to FIG. 2, this shows an arrangement for UHF amplification in a color television transmitter. A UHF vision carrier, modulated by vision signals and by a color subcarrier and a VHF carrier modulated by accompanying sound signals are applied from terminal 1 via the "through" connection of a 20 to 30 db. directional coupler and a delay circuit 5 to a P.I.N. diode attenuator 4 as known per se and illustrated as comprising a diode 41 (there could be more than one diode, of course) in a coaxial cable structure 42. The output from the attenuator is amplified by an amplifying Klystron 3 and fed to a transmitting antenna (not shown).

UHF branched off from the input by the coupler 2 is rectified by a rectifier 6, and the resultant is amplified by a variable gain video amplifier 7 having a pass range of (say) 0–6 m.c.p.s. and applied as an attenuation-controlling signal to the diode 41. The delay of the circuit 5 is such that the signal delay between the input terminal 1 and the diode 41 via the said delay circuit is the same as that between the same points 1 and 41 via the rectifier 6.

Figure 3:
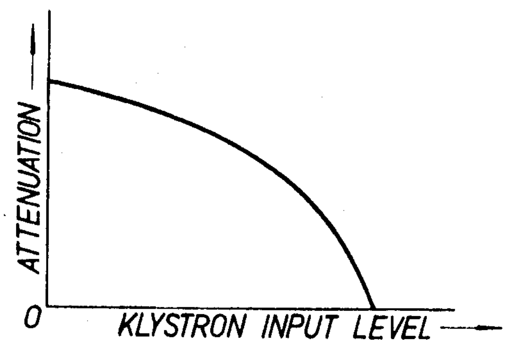

The operating level/attenuation characteristic of the controlled attenuator 4 is shaped as exemplified by FIG. 3, i.e., is such that the combined effect of the full line characteristics of FIGS. 1 and 3 is to produce an output/input characteristic between the output at the final output terminal 8 and the input at terminal 1 which is substantially linear over a working input range at 1 extending from zero to a value at which the Klystron is fully loaded or nearly so. Accordingly, as may be shown, although undesired intermodulation products will be produced by the P.I.N. diode attenuator 4 and appear at its output, they will be substantially annulled by compensating or cancelling intermodulation products resulting from the nonlinearity of the amplifying Klystron 3. The invention therefore allows the Klystron 3 to be satisfactorily employed efficiently, i.e., without heavy derating.

I claim:

1. A UHF amplifier suitable for amplifying carriers modulated with a plurality of signals comprising a signal path including a directional coupler, a delay circuit having a given delay, an attenuator having as a part thereof a positive, intrinsic, negative diode, and an amplifying Klystron coupled one to another in the order stated; and a control signal developing path comprising a rectifier means coupled to an output from said directional coupler to receive a portion of energy passing through said directional coupler for developing a variable DC control signal proportional to input to said delay circuit from said directional coupler, and means for utilizing said variable DC control signal for controlling attenuation of said attenuator; said given delay of said delay circuit being substantially equal to delay in said control signal developing path extending from said directional coupler to said attenuator; whereby intermodulation products which may be produced by the positive, intrinsic, negative diode and those which may result from inherent nonlinearity of Klystrons are substantially annulled and the amplifying Klystron may be employed efficiently without heavy derating.

2. A UHF amplifier as claimed in claim 1 including a variable-gain video amplifier having its input coupled to said rectifier means for receiving said variable DC control signal therefrom and its output coupled to an electrode of said positive, intrinsic, negative diode.

* * * * *